Dec. 26, 1922.
E. KAMPER.
PIPE CUTTING MACHINE.
FILED JAN. 6, 1919.
1,439,963.
9 SHEETS—SHEET 1.
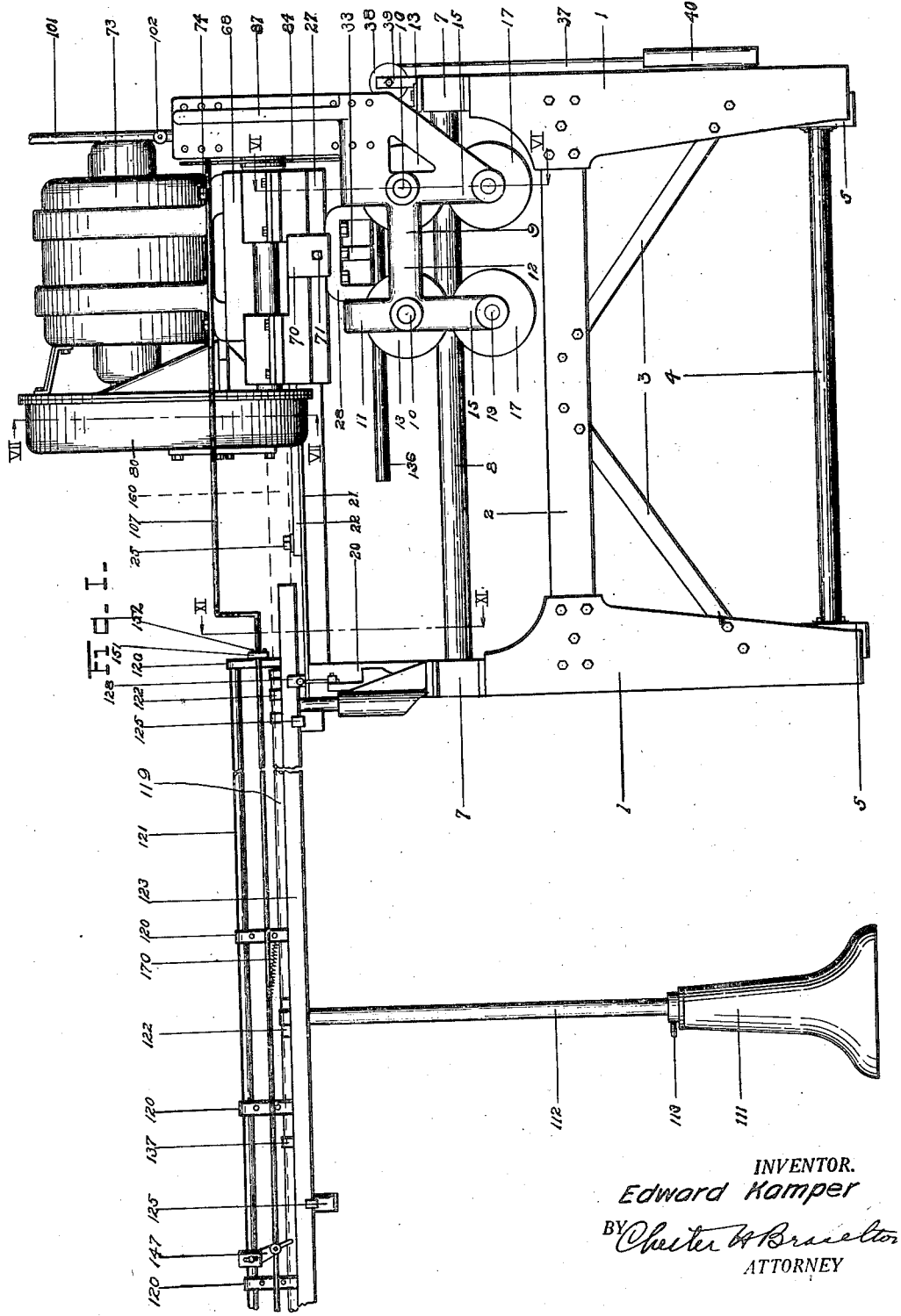
INVENTOR.
Edward Kamper
BY Chester H Braselton
ATTORNEY

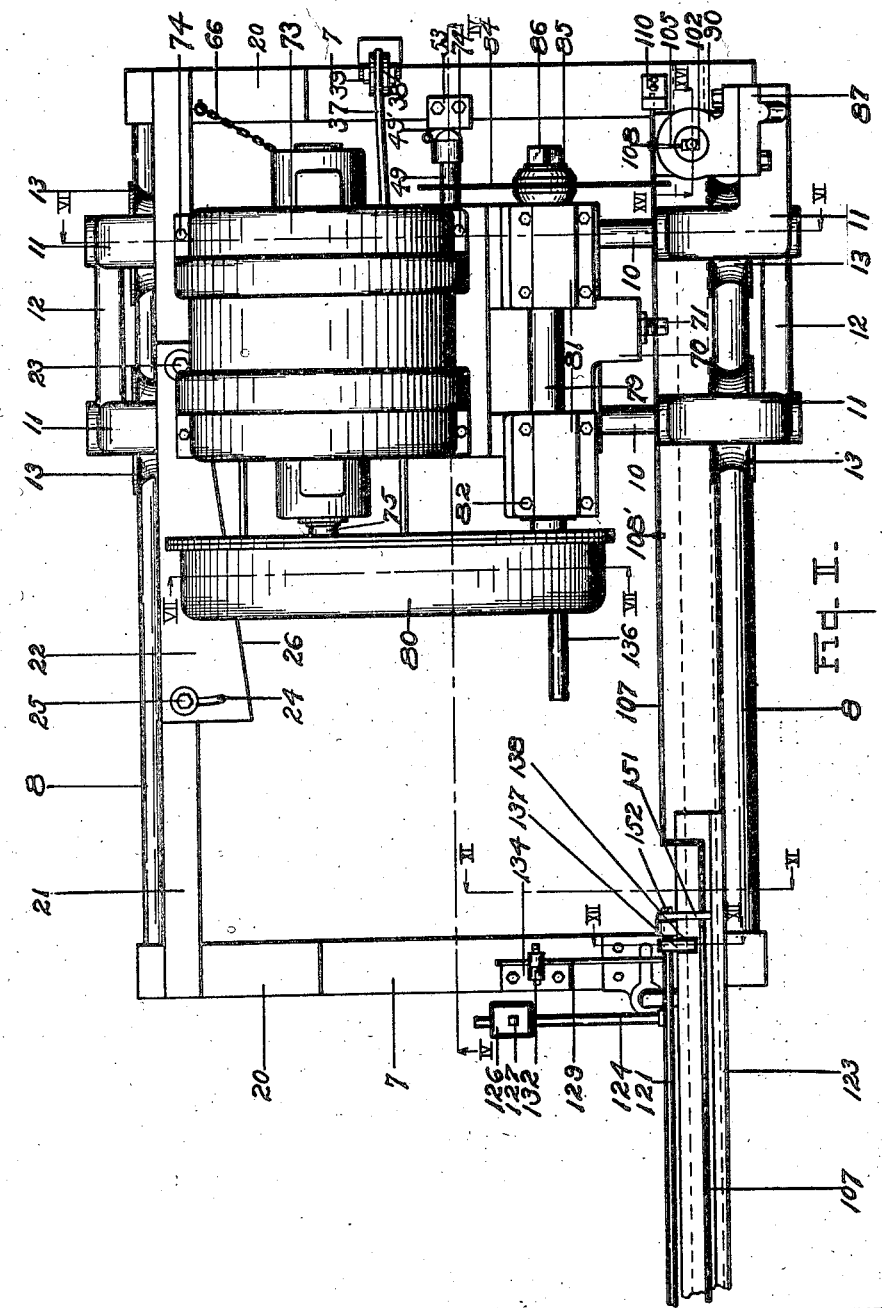

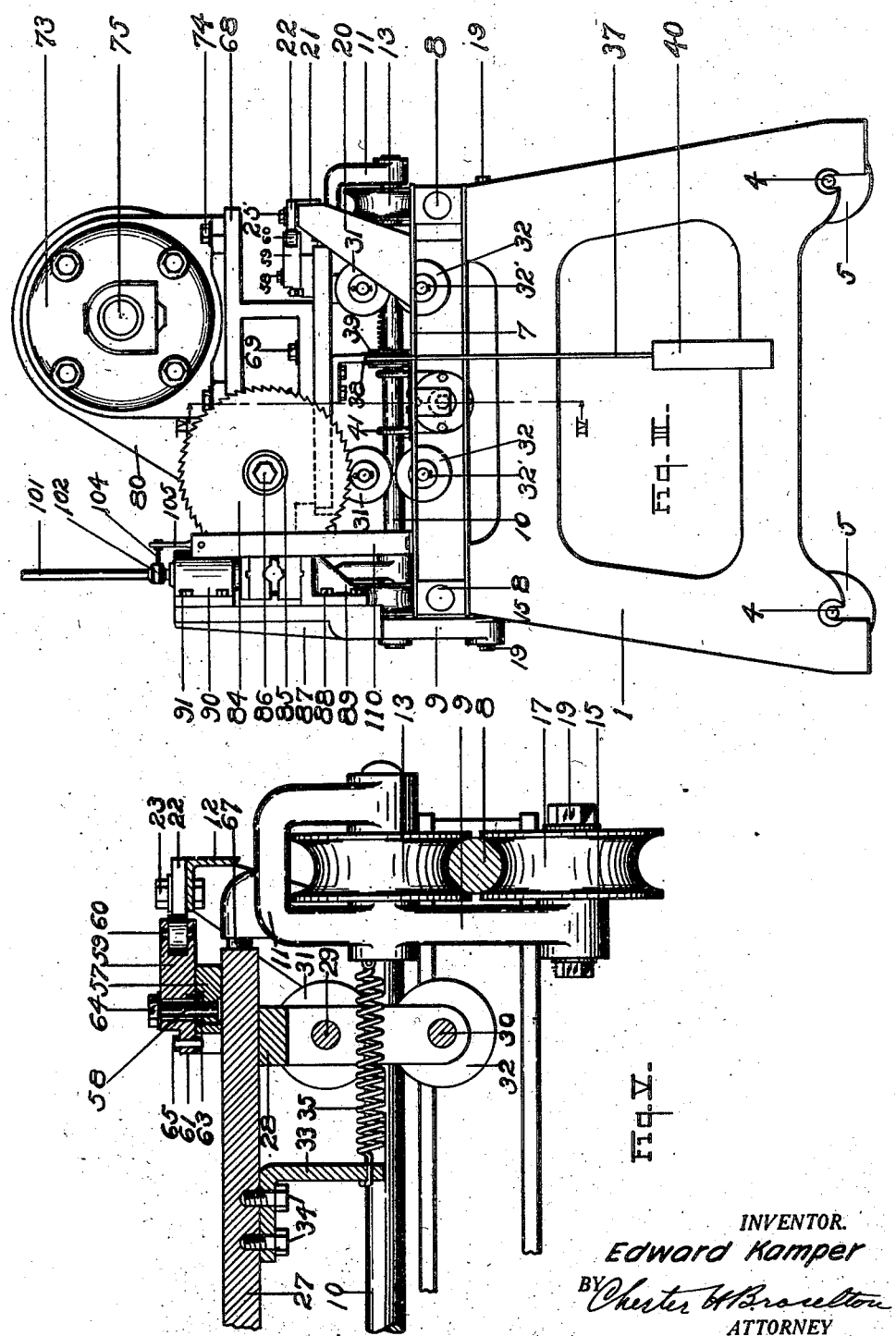

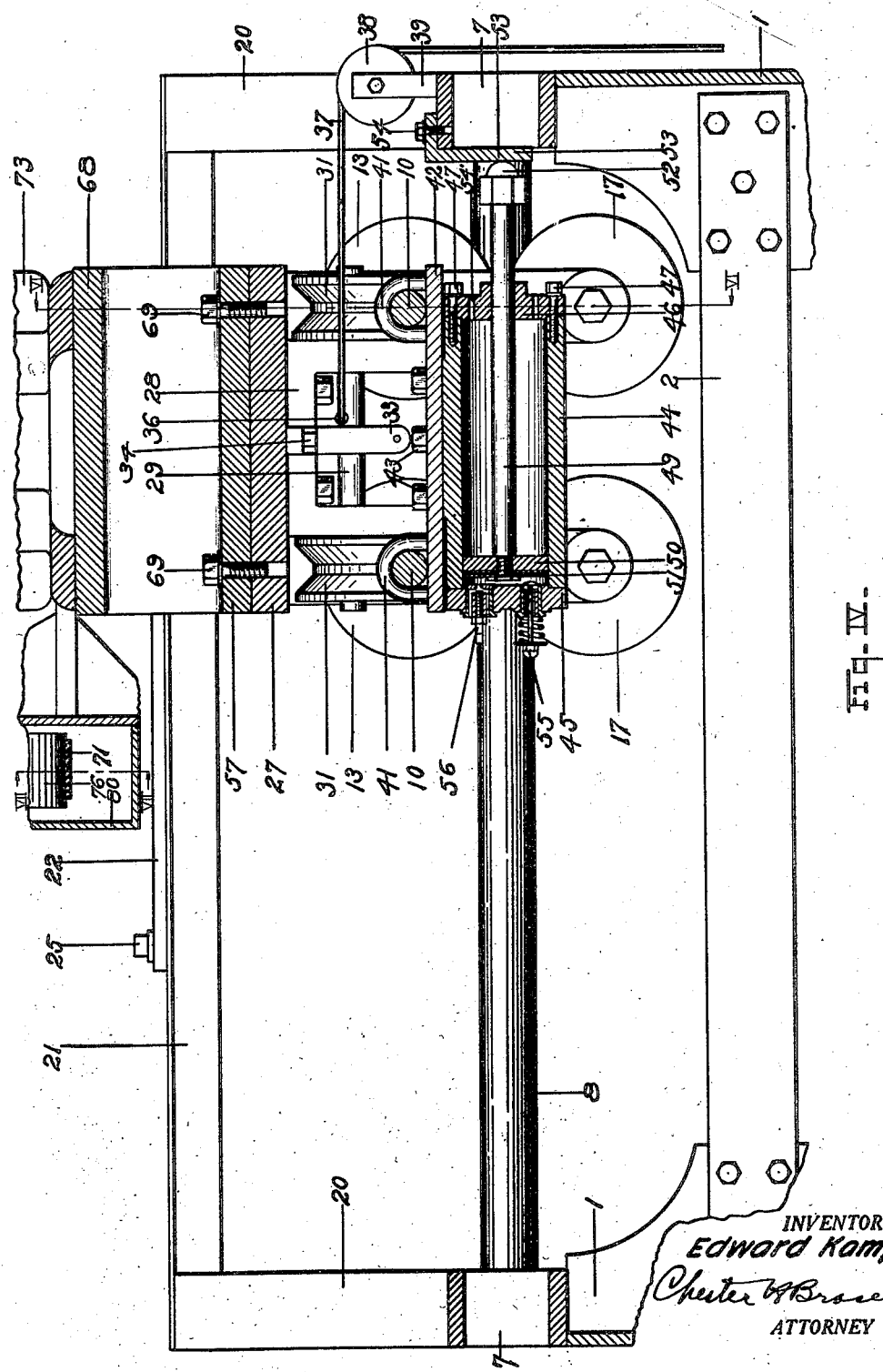

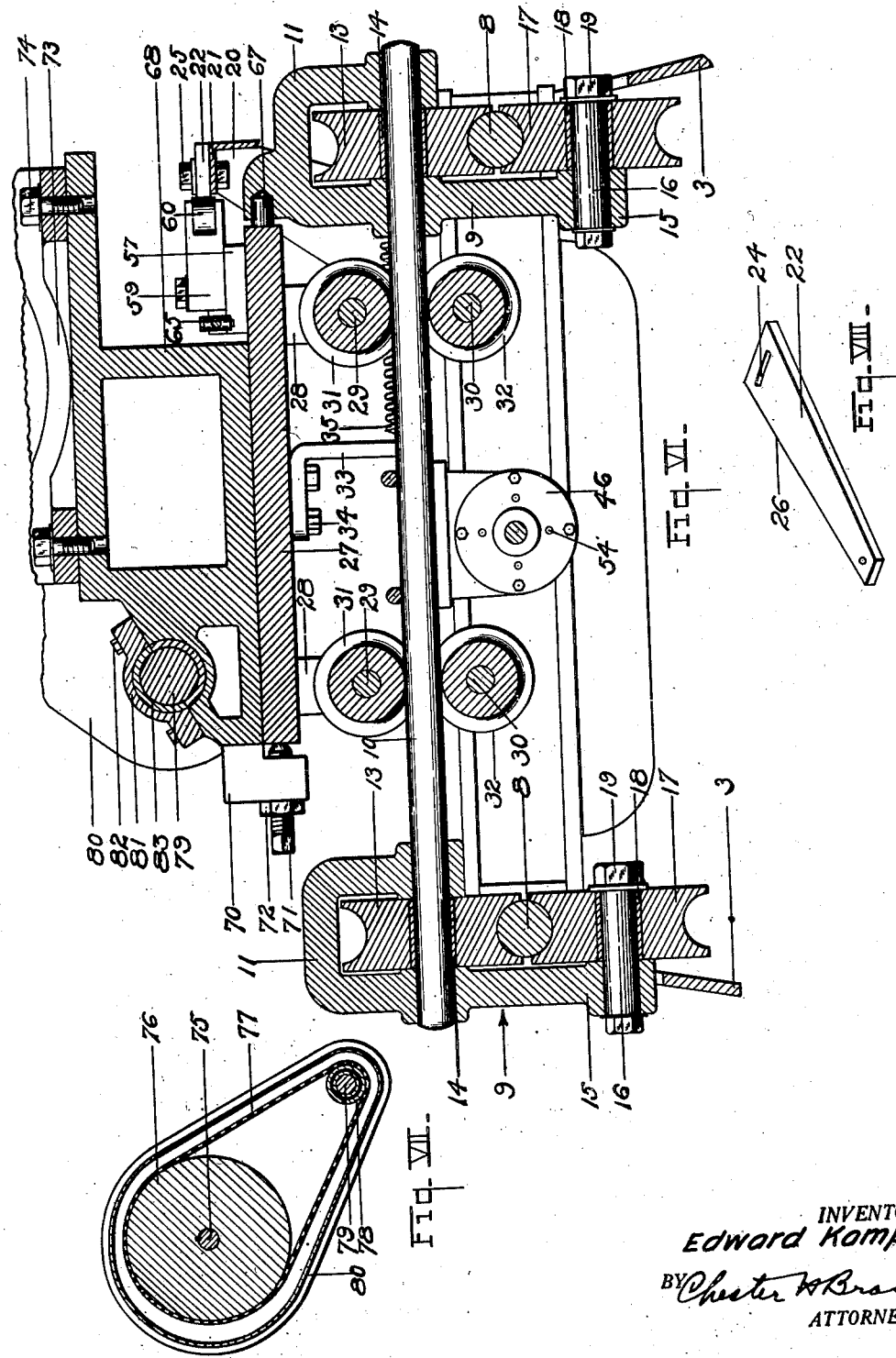

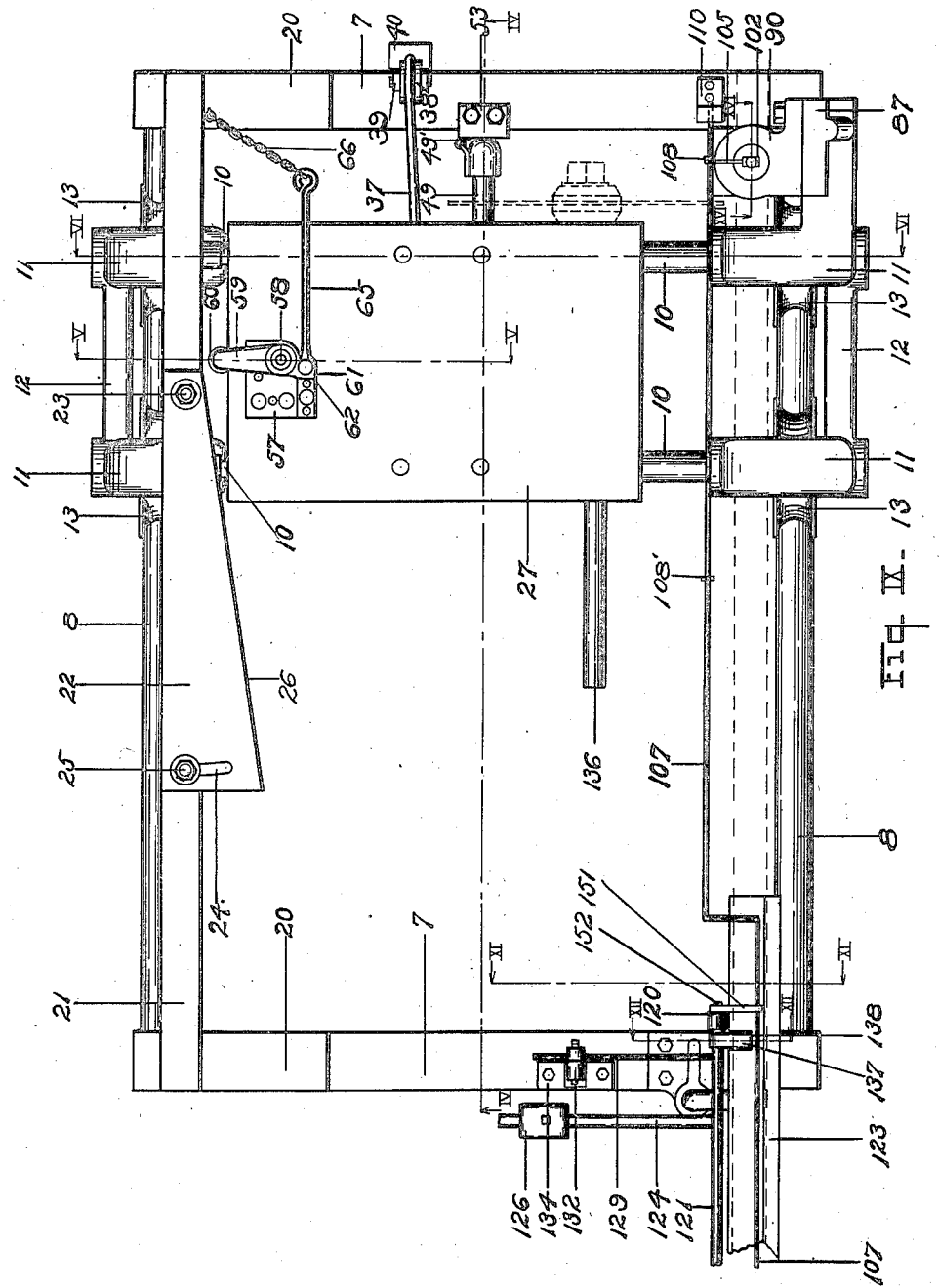

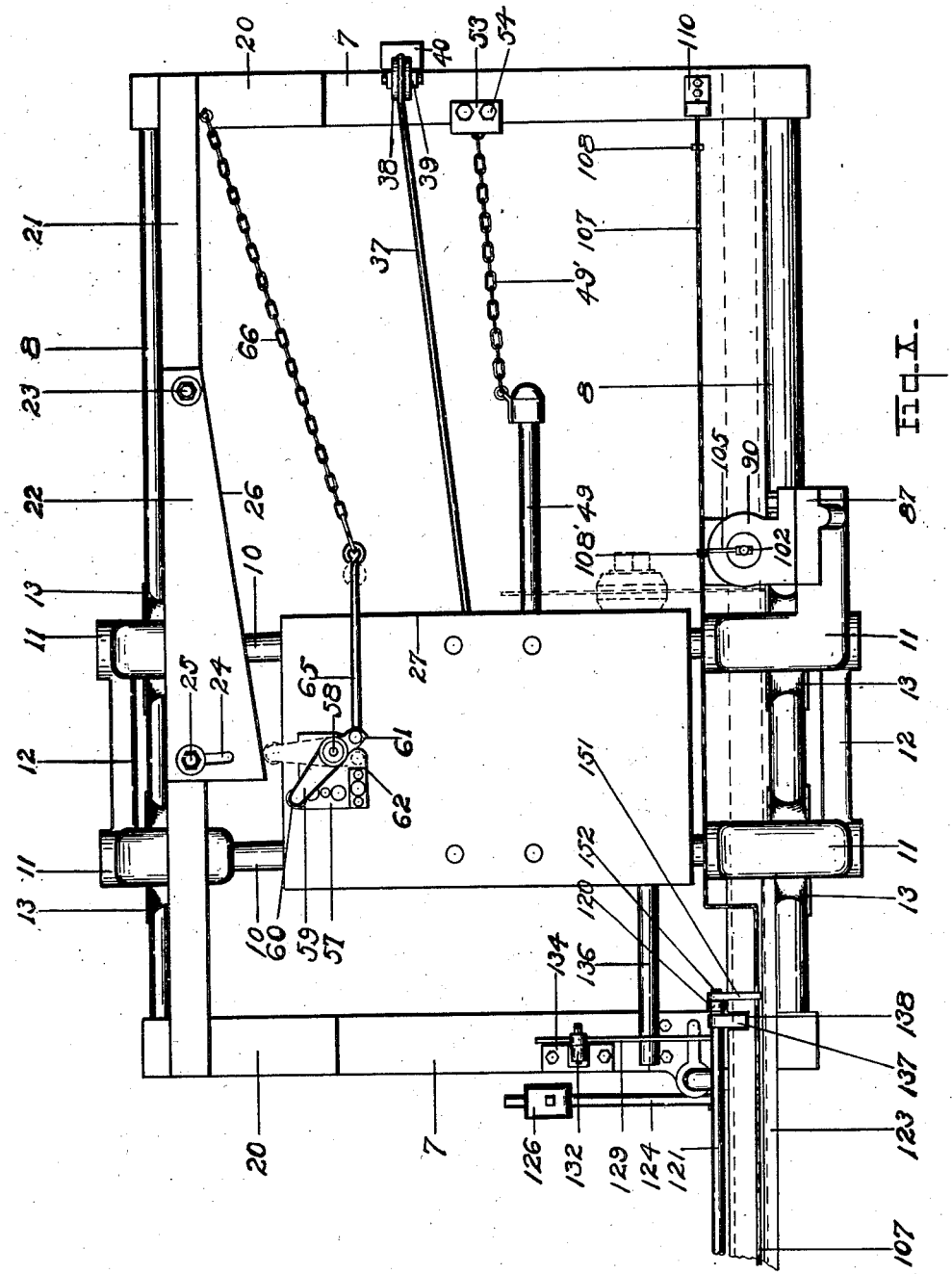

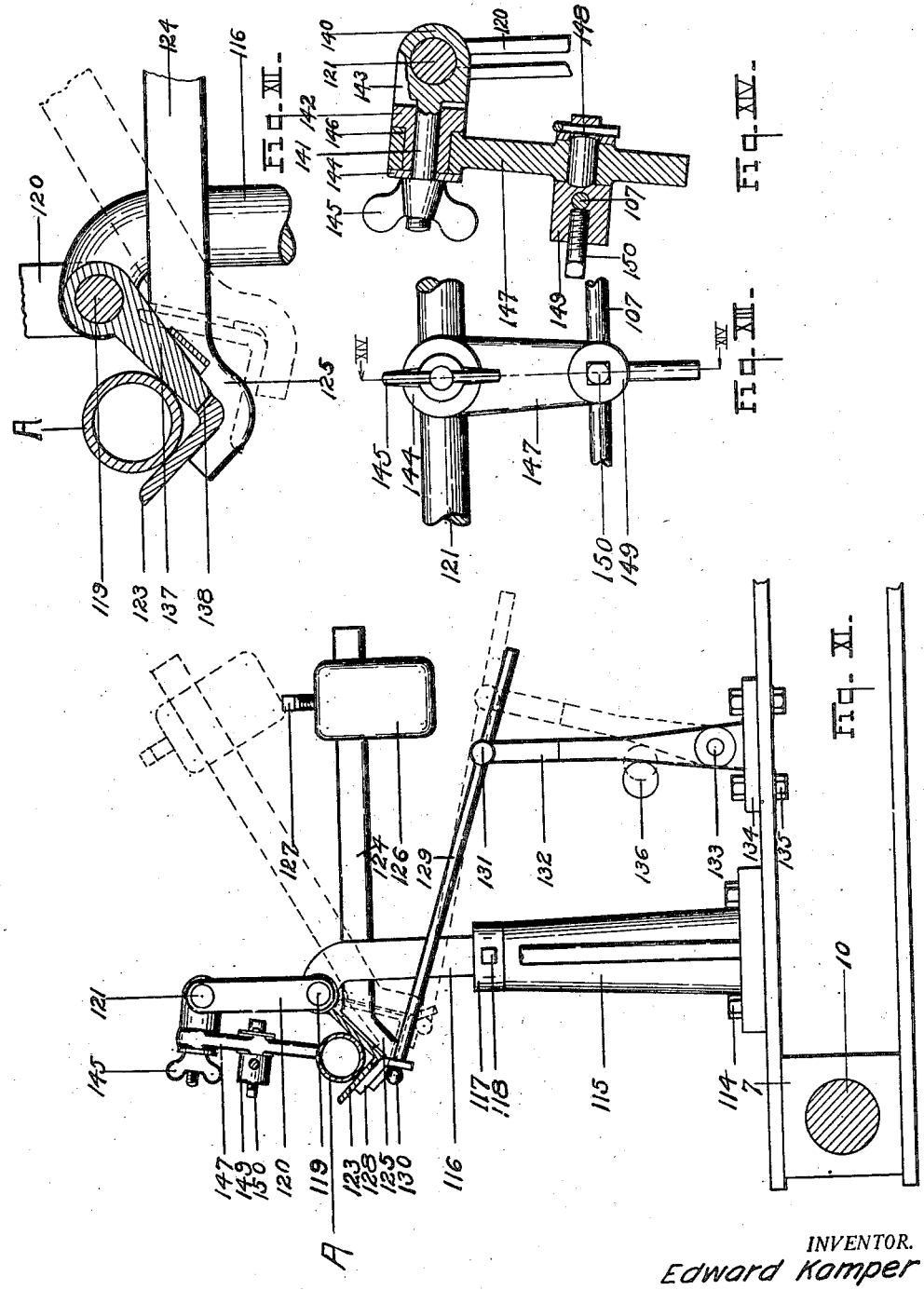

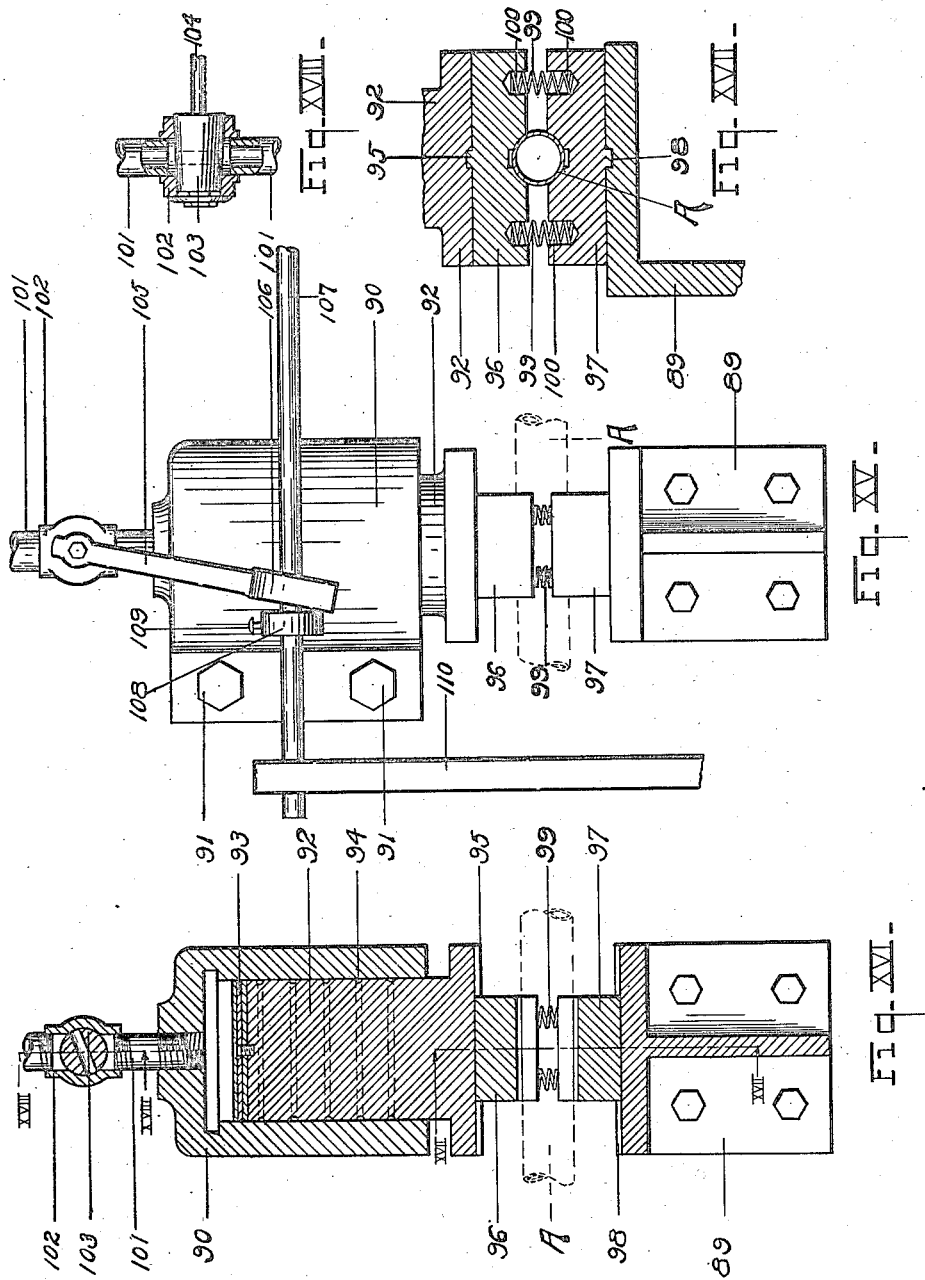

Patented Dec. 26, 1922.

1,439,963

UNITED STATES PATENT OFFICE.

EDWARD KAMPER, OF TOLEDO, OHIO, ASSIGNOR TO THE WILLYS-OVERLAND COMPANY, OF TOLEDO, OHIO, A CORPORATION OF OHIO.

PIPE-CUTTING MACHINE.

Application filed January 6, 1919. Serial No. 269,939.

*To all whom it may concern:*

Be it known that I, EDWARD KAMPER, a citizen of the United States, residing at Toledo, in the county of Lucas and State of Ohio, have invented certain new and useful Improvements in Pipe-Cutting Machines, of which I declare the following to be a full, clear, and exact description.

This invention relates to pipe cutting machines, and has to do more particularly with machines of that character which are automatic in their operation. The improved pipe cutting machine is particularly adapted for use in cutting a long pipe into sections of equal length. The improved pipe cutting machine is automatic in its operation, in that when once put in operation, it will continue to cut the pipe as it is fed forwardly therein into fixed and equal lengths without further attention from the operator.

One object of this invention is to provide an improved pipe cutting machine which is of simple construction wherein the various parts will cooperate properly under various conditions of use.

Another object of this invention is to provide a machine of this character which will feed the cutting mechanism forwardly during the passage of the pipe through the machine.

A further object of this invention is to provide means for positively discharging the cut sections of pipe from the machine after the completion of the pipe cutting operation.

A further object of this invention is to provide means for actuating the clamping mechanism in such a manner that it properly grasps the pipe to be cut and releases the same at suitable intervals in the operation of the machine.

A further object of this invention is to provide means for automatically returning the carriages to their initial positions upon completion of their operations.

A further object of this invention is to provide a simple and economical machine of the character described which is simple in its operation and of durable construction.

Further objects of this invention relate to economies of manufacture and details of construction as will hereinafter appear from the detailed description to follow.

In forming pipe from a tube mill it has been the practice to operate the tube mill for a period until a pipe of considerable length has been formed, and then discontinue operation of the mill and cut the pipe into suitable lengths. This causes considerable delay and makes it necessary to stop the operation of the tube mill while the pipe is being cut into lengths. By the use of this improved pipe cutting machine the tube as it advances from the mill passed into the pipe cutting machine and passes therethrough until it strikes a trip which serves to actuate a pneumatic operated chuck for clamping the same to the pipe. The position of the trip may be adjusted with respect to the frame so that the length of pipe beyond the point where the jaws of the chuck are clamped may be varied, and consequently the lengths of the sections into which the pipe is to be cut.

The chuck is firmly secured to a traveling carriage which is capable of moving in a direction longitudinally of the machine, and when the pipe has been clamped thereto the carriage moves toward the rear of the machine with the carriage being carried along by the pipe in its movements as the pipe is fed from the tube mill. The carriage mounted on the frame of the machine moves longitudinally of the machine and supports a second carriage which is capable of movement transversely of the machine on the first named carriage, and is also carried toward the rear of the machine by the first named carriage as the first carriage is carried rearwardly by the pipe. The second carriage carries a saw and means for operating the same, the plane of the saw being transverse to the path of movement of the pipe, and the second carriage is caused to move in a transverse direction across the machine by co-operating devices on the frame of the second carriage and the frame of the machine, including a cam-member. As the second carriage moves across the frame the saw carried thereby is actuated and cuts the pipe as it moves thereacross, the pipe being firmly clamped to the first carriage until after the completion of the cutting operation, and both of the carriages moving along the frame with the pipe. After the pipe has been severed by the saw, means is provided for releasing the second carriage from the force impelling it across the frame and the second carriage is returned to that side of the frame where it was originally positioned. As the second carriage is returned to the side of the frame where it was originally positioned it operates mechanism for discharging the length of severed pipe from the machine, whereby the trip which controls the operation of the chuck jaw is released and the first carriage freed from connection to the pipe. Constantly acting means is provided for returning the first carriage together with the second carriage carried thereby to the front of the machine upon the release of the first carriage from the pipe.

The operating parts are now in their original positions and so placed as to repeat the operation described when the pipe as it advances into the machine again actuates the trip mechanism. By means of this construction the pipe is cut into lengths which are substantially equal, and the operation of the various parts being automatic, the mechanism continues to act in the manner described so long as the pipe continues to be fed into the machine from the tube mill.

I accomplish the objects of my invention in one instance by the devices and means described in the following specification, but it is evident that the same may be varied widely without departing from the scope of the invention, as pointed out in the appended claims.

A structure constituting one embodiment of my invention, which may be preferred, is illustrated in the accompanying drawing forming a part thereof, in which:

Fig. I is a side elevational view of the machine showing the location of the parts with respect to each other when in assembled position.

Fig. II is a plan view of the machine as shown in Fig. I having a portion of the pipe support broken away.

Fig. III is an end elevation of the machine as seen from the right in Fig. I.

Fig. IV is a vertical-sectional view of a portion of the machine taken along the line IV—IV of Figs. II, III and IX.

Fig. V is a vertical, transverse sectional view of a portion of the machine taken along the line V—V of Fig. IX.

Fig. VI is a vertical-sectional view of a portion of the machine taken along the line VI—VI of Figs. I, II, IV, and IX.

Fig. VII is a vertical-sectional view taken along the line VII—VII of Figs. I, II and IV.

Fig. VIII is a perspective view of the cam shown in Figs. II, IX and X.

Fig. IX is a top plan view of the portion of the machine, with the motor removed to more clearly show the position of certain of the operating parts.

Fig. X is a top plan view of a portion of the machine with the motor removed, showing the traveling carriage in its forwardly extended position.

Fig. XI is a sectional view taken along the line XI—XI of Figs. I, II and IX, showing in elevation a portion of the operating parts for the pipe supports.

Fig. XII is a vertical-sectional view taken along the line XII—XII of Figs. II and IX.

Fig. XIII is an enlarged front view of the trip member.

Fig. XIV is a sectional view of the trip member taken along the line XIV—XIV of Fig. XIII.

Fig. XV is a side elevational view of the chuck looking from the right in Fig. III.

Fig. XVI is a vertical-sectional view of the chuck and its operating parts taken along the line XVI—XVI of Figs. II and IX.

Fig. XVII is a vertical-sectional view taken along the line XVII—XVII of Fig. XVI.

Fig. XVIII is a sectional view taken along the line XVIII—XVIII of Fig. XVI.

In the drawings, similar reference characters refer to corresponding parts throughout the several views, and the sectional views are taken looking in the direction of the small arrows at the ends of the section lines.

My invention comprises generally a pipe cutting machine which may be positioned in proximity to a tube mill to receive the pipe therefrom and cut the same into suitable lengths. As the rolled pipe comes from the tube mill, it passes between the jaws of a chuck and moves at a substantially constant rate of speed into the pipe cutting machine. Mechanism is provided for clamping the jaws of the chuck upon the pipe at certain fixed intervals along its length, whereby the traveling carriage is set in motion and the pipe cutting mechanism is operated to cut the pipe into sections. Adjustable tripping mechanism is provided for operating the jaws of the chuck whereby the mechanism is operated in such a manner as to cut the pipe into sections of equal length.

Referring to the numbered parts of the drawings, a suitable supporting frame for the machine is provided, which comprises end castings 1 at the front and rear thereof, connected by transverse frame members 2 extending between corresponding sides thereof, the same end castings and side frame members being bolted together, and additionally secured in position relative to each other by brace members 3, the same brace members being securely bolted both to the end castings and to the side frame members. Shafts 4 provided with wheels rotatably secured thereto near the ends thereof are mounted at their ends in opposite castings 1 at points near the lower edges of the castings, thus providing means whereby the machine can be readily moved from place to place. A bed frame is mounted upon the supporting frame, and comprises transverse beams 7 mounted upon and rigidly attached to the castings 1 in any desired manner, as by being bolted thereto, and longitudinally parallel rods 8 having their end portions suitably mounted in the transverse beams 7 at points near the extremities thereof, the said beams and rods being firmly secured together in any desired manner. Mounted upon the longitudinal rods 8 and adapted to travel thereon in a direction longitudinally of the machine is a traveling carriage formed of side castings 9 suitably connected together and held in proper position relative to each other by a pair of transversely extending rods 10. The castings 9 are each in the form of a pair of yoke members 11, connected together by a bar 12. Each of the yoke members has one branch thereof of considerably greater length than the other for a purpose that will be hereinafter described. The transverse rods 10 pass through the branches of the corresponding yoke members upon the opposite sides of the machine, being secured thereto in any desired manner, and have rotatably mounted thereon between the branches of each yoke member grooved wheels 13. The grooved wheels 13 are provided with bushings 14 and are mounted upon the shaft 10 between the branches of the yoke in such a manner as to be freely rotatable thereon. The grooved wheels 13 upon opposite sides of the machine are mounted to travel upon the upper surface of the two longitudinally extending rods 8 respectively. In each of the downwardly extending lower portions 15 of the longer branches of the yoke members 9 is mounted a stub shaft 16, and upon each of the several stub shafts 16 is rotatably mounted a grooved wheel 17, similar in all respects to the grooved wheels 13 and provided with a bushing 18. The grooved wheels 17 are retained upon the shaft 16 by nuts 19, and the grooved wheels 17 upon opposite sides of the machine are mounted to travel upon the lower surfaces of the two oppositely positioned rods 8 respectively, in a manner similar to that in which the grooved wheels 13 are mounted to travel upon the upper surfaces of the said rods. From this construction it results that the traveling carriage comprising the castings 9 and the rods 10, is mounted for movement longitudinally of the machine upon the rods 8 forming a portion of the bed frame, and any forward or rearward tilting action of the carriage as it moves along the rods 8 and any drag of one side of the carriage relative to the other is prevented by the wheels 13 and 17 mounted in the brackets 9 at opposite ends of the cross rods 10 and arranged on opposite sides of the rods 8 and fitting closely against the upper and lower surfaces of the same. Firmly secured to the two transverse beams 7 as by being bolted or riveted thereto, near one side of the machine, are upstanding brackets 20 carrying an angle iron beam 21, which is in turn firmly secured to the upper ends of the brackets. A cam member 22 is pivotally attached at one end to the longitudinal beam 21 by a bolt 23, the same cam being provided at its opposite end with a slot 24 through which passes a bolt 25, whereby the inner cam face 26 of the cam member 22 may be secured in a variety of adjusted positions relatively to the beam 21.

A second traveling carriage comprising a platform 27 is mounted upon the transverse rods 10 for movement transversely of the machine. A plurality of downwardly extending U-shaped bracket members 28 are firmly secured to the under surface of the platform 27 in any well known manner, and each of the bracket members has mounted thereon upper and lower shafts designated by the numerals 29 and 30 respectively. Upon each end of each of the shafts 29 is rotatably mounted a grooved wheel 31, while upon each end of each of the lower shafts 30 is mounted in a similar manner a corresponding grooved wheel 32, the said wheels being held upon the ends of the shafts and against the bracket by cotter pins 32'. The two upper wheels upon each side of the platform are mounted to travel upon the upper surface of one of the transversely extending rods 10, and in a similar manner the two lower grooved wheels 32 upon each side of the platform are mounted to travel upon the lower surface of one of the transverse rods 10. From this construction it results that the platform 27 and the mechanism carried thereby is mounted in such a manner as to be capable of travel upon the first named traveling carriage, and in a direction transversely of the direction of travel of the first-named carriage and across the machine. The provision of the upper and lower grooved wheels 31 and 32 mounted for travel upon the upper and lower surfaces of the transverse rods prevents the platform 27 from any forward or rearward tilting action as it moves along the rods 10 and any drag of one side of the carriage relative to the other.

A bracket 33 is secured to the under surface of the platform 27, as by bolts 34 and a heavy coiled spring 35 is attached to the bracket 33, and to the right hand casting 9, as seen in Fig. V, for the purpose of returning the traveling platform to that side of the machine after it has completed its work. As the second carriage moves toward the left of the machine in Figs. III and VI, under the influence of the cam face 26; it moves against the force exerted by the coiled spring 35 and tends to extend the same. When the force causing the second carriage to move to the left, as stated, is released, the coiled spring acts to return the carriage toward the right side of the machine as viewed in Figs. III and VI. A cable 37 is also connected with the bracket 33 by an eye-bolt 36, the cable passing over a pulley 38 which is mounted upon a bracket 39 attached to the transverse bed plate 7, and having a weight 40 secured thereto to insure the return of the two traveling platforms upon the completion of their work. The second traveling carriage being mounted upon the first carriage and carried thereby in a direction longitudinally of the machine, the two carriages move together when they are returned to the front of the machine under the influence of the weight 40. Secured to the two transverse rods 10 at a point near the centers thereof, as shown in Fig. IV, by means of U-bolts 41 is a plate 42, which has attached to its lower face in any suitable manner as by bolts 43 a cylinder 44. The cylinder 44 is provided with heads 45 and 46 secured to the main portion of the cylinder in any suitable manner as by bolts 47. A piston rod 49 passes through a central opening in the head 46 and extends within the casing carrying upon its inner end a piston head 50 provided with piston rings 51 for preventing the escape of air past the piston head during its movement in the cylinder. Upon that end of the piston rod which is without the cylinder, a bumper 52 preferably of resilient material such as hard rubber is provided. A plate 53 is attached to the transverse beam 7 by bolts 54, which is so positioned that it will be engaged by the bumper 52 upon the end of the piston to cause a slowing up of the traveling carriage as it returns to its initial position. The cylinder head 46 is provided with openings 54' to permit the passage of air there-through upon movement of the piston head in either direction. The cylinder head 45 is provided with an inwardly opening spring pressed valve 55 and an outwardly opening spring pressed valve 56, the spring for controlling the inwardly opening valve 55 being preferably weaker than the spring for controlling the outwardly opening valve 56, whereby the less resistance is opposed to the admission of air through the valve 55 upon movement of the piston head to the right as seen in Fig. IV, than is encountered when the air is forced outwardly through the valve 56 by movement of the piston head in the opposite direction. A chain or cable 49', the length of which may be adjusted as desired, connects the end of the piston rod 49 and the plate 53, the said chain or cable being of such length that the piston rod and the head carried thereby will be moved somewhat to the right in the cylinder as shown in Fig. IV by the movement of the traveling carriage prior to its reaching the limit of its movement rearward.

It will be seen from the above description that the piston rod 49 is drawn forwardly as the carriage approaches its rearward position, and air is consequently drawn into the cylinder through the spring pressed valve 55. When the carriage is returned to its initial position the piston rod striking the buffer plate 53 will force the air outwardly through the valve 56 against the resistance of the valve and consequently slow up the movement of the carriage and prevent injury thereto. By reason of the openings 54' in the cylinder head 46 the air on that side of the piston head towards the cylinder head 46 offers practically no resistance to the movement of the piston toward the cylinder head 46 when the piston is drawn in that direction by the cable 49'.

It is to be understood that my invention is not restricted to be used with this form of buffer device which I have shown and described but I may make use of any of the various forms of buffers for slowing up the movement of the carriage during its return to its initial position. Mounted upon the upper surface of the traveling platform 27 is a block 57 secured thereto in any suitable manner, as being bolted thereon, and provided with an upwardly extending bolt 58 upon which is mounted for pivotal movement, an arm 59 provided at one end thereof with a roller 60. The arm 59 is normally held in the position shown in Fig. IX, with one end 61 in engagement with an abutment 62 formed on the block 57, by means of a coiled spring 63 mounted within a recess formed in the upper face of the block 57, one of the ends of said spring being secured to the arm 59 and the other end being attached to the block 57. The arm 59 is retained upon the bolt 58 by means of a nut 64. The end 61 of the arm 59 is connected by means of a pivotal link 65 and a chain or cable 66 with the rear transverse beam 7 of the machine. The length of the chain or cable 66 may be varied as circumstances render expedient. As the platform 27 proceeds toward the rearward part of the machine, the roller 60 upon the arm 59 contacts with the cam face 26 of the cam member 22, thus forcing the platform 27 across the machine in a direction transverse thereof to secure the proper operation of the mechanism. When the platform 27 approaches the limit of its rearward movement, the arm 59 carrying the roller 60 will be drawn inwardly within the edge of the platform 27 by reason of the force exerted by the link 65 and the cable 66 overcoming the tension of the spring 63. When the arm 59 and the roller 60 carried thereby are drawn within the edge of the platform in the manner described above, the tension exerted by the spring 35 tends to return the platform 27 and the mechanism carried thereon to its original position relative to the first traveling carriage, and toward the right as seen in Fig. VI. As the carriage 27 is moved rearwardly it is forced across the machine in a direction transverse thereof for the purpose of moving the saw carried by the platform across the work to cut the same. As the longitudinally moving carriage approaches the limit of its rearward movement the saw is moved entirely across the pipe and completely severs the same. Further movement of the platform 27 across the machine becomes unnecessary after the pipe has been cut and the chain 66 is formed of such length that it will cause the roller 60 to be withdrawn out of contact with the cam face 26 shortly after the cutting of the pipe. Upon withdrawal of the roller 60 from contact with the cam face 26, the platform 27 will be returned to its original position at the right of the machine as shown in Figs. III and V by the spring 35.

The mechanism carried upon the platform 27 is protected from injury due to the jar occasioned by the striking of the platform against the right hand casting as shown in Fig. VI, by means of buffer members 67 of rubber or other suitable material mounted in the face of the right hand casting 9, as seen in Fig. VI. A frame member 68 for supporting the motor and the cutting mechanism connected therewith is mounted upon the platform 27 and firmly secured thereto, as by bolts 69. The frame 68 is provided with a downwardly extending lip 70 upon one side thereof which overlies an edge of the platform 27, and is provided with an interiorly threaded opening therein. A set screw 71 is threaded through the opening in the lip 70 in such a manner as to bear against the edge of the platform 27, and assist the bolts 69 in holding the frame securely upon the platform and against movement relative thereto. The set screw 71 when clamped against the edge of the platform is secured from movement relative to the lip 70 by means of the clamping nut 72. It will be seen that by means of this construction a portion of the strain placed upon the bolts 69 during the operation of the machine, which might cause the breaking or loosening of the bolts, is transferred through the lip 70 and set screw directly to the edge of the platform 27.

Upon the upper surface of the frame 68 is mounted a motor 73, which is firmly secured to the frame by bolts 74, and carries a shaft 75 upon which is keyed in the usual manner a driving pulley 76. The driving pulley 76 is provided with an endless belt 77, of any approved construction, passing over a pulley 78 mounted upon a shaft 79 for the purpose of rotating the shaft. The pulleys 76 and 78 together with the endless belt 77 for communicating rotative movement from one to the other are enclosed in a casing 80, thus protecting these parts from injury. The shaft 79 is mounted in bearings, portions of which are formed integral with the frame 68 and provided with cover sections 81; the two parts being held securely together by bolts 82, a bushing 83 being provided within the bearings as is clearly shown in Fig. VI. A saw 84 provided with a hub 85 is attached to one end of the shaft 79 in any suitable manner, as by being fitted over an angular portion formed upon the end thereof, and is secured thereto by a nut 86. The motor 73 and the saw 84 together with the co-operating mechanism connecting the same are carried by the second movable carriage and move therewith at all times. The frame 68 supports these parts in suitable operative relation with respect to each other and it will be seen that the bearings for the shaft 79 are so formed in the frame 68 as to resist the twisting movement exerted upon the frame when the saw is cutting through a section of pipe, as the second carriage moves across the machine under the influence of the cam face 26 of the cam member 22. It will be apparent also that the overlying lip 70 and set screw 71 serve to distribute the severe strain upon the frame 68 when the saw is in operation.

The casting 9 which is shown upon the left side of the machine as seen in Fig. III is provided with an upright standard 87 having secured thereto as by bolts 88 a base plate 89, said standard carrying upon its upper end a cylinder 90 firmly secured thereto by bolts 91. A piston 92 is slidably mounted within the cylinder 90 and is provided with piston rings 93 to prevent the escape of air between the cylinder and the piston, the said piston head being also provided with oil ducts 94. Mounted upon the lower face of the piston 92 by a tongue and groove connection 95 is one of the jaws 96 of the chuck member; the other jaw 97 of the chuck member being attached by a similar tongue and groove connection 98 to the base portion 89. A plurality of coiled springs 99 are seated in registering openings 100 suitably positioned upon the faces of the jaws 96 and 97, and tend to separate the jaws. Connected with the interior of the cylinder 90 through the opening in the upper portion thereof is a compressed air pipe 101, provided with a valve coupling 102, within which is mounted a rotatable valve 103 having its stem 104 extending through the casing of the valve coupling and provided with a downwardly extending arm 105, keyed or otherwise firmly secured thereto. The lower end of the arm 105 is forked as at 106 to embrace a slidably mounted operating rod 107, provided with an adjustable collar 108 which may be secured in a variety of adjusted positions upon the rod by means of the set screw 109. The rod 107 is mounted for sliding movement at a point near the front of the machine in a bracket 110 which is firmly secured in position by being bolted to the front transverse beam 7. The purpose of the mechanism above described is to clamp the movable carriage mounted upon the rods 8 to the pipe A or material to be cut as it is fed into the machine from the tube mill. The mechanism described above is set in operation by a mechanism hereinafter described and when thus set in operation clamps the jaws 96 and 97 upon the pipe and holds them in clamped position until released. As a result of clamping the jaws to the pipe the first carriage is moved rearwardly of the machine by the pipe as it advances and the second carriage carried by the first carriage is also moved rearwardly and transversely of the machine.

Positioned rearwardly of the main portion of the machine is a base 111 provided with a supporting member 112 which slides within the base, and is capable of being secured in a variety of adjusted positions relative thereto by means of the set screw 113. Secured to the rearward transverse beam 7 of the machine by bolts 114 is a base member 115 within which is slidably mounted a support 116 carrying a collar 117 provided with a set screw 118, by means of which the supporting member 116 may be secured in a variety of adjusted positions relative to the base 115. The supports 112 and 116 carry a horizontal supporting frame member 119 attached to the upper portions thereof, the vertical position of which member may be changed as desired by the vertical adjustment of the support. Rigidly attached to the member 119 are a plurality of upstanding brackets 120, which carry a second horizontal member 121. A receiving trough 123 is pivotally supported from the rod 119 by means of straps 122, the said trough being normally held in such position as to support the pipe as it is being operated upon by the machine. The straps 122 may be attached to the member 119 at such points therein as may be found necessary; and secured to the trough in any desired manner, as by being riveted or bolted thereto. Arms 124 are each provided with an angular portion as 125 at one end thereof, the said angular portion being secured to the trough in any desired manner so that the trough and arms are rigidly connected together. Mounted upon the arms 124 are sliding weights 126, the object of which is to counter-balance the weight of the trough upon its fulcrum point on member 119 so as to normally hold the trough in such a position as to receive and support the pipe being operated upon by the machine. The weights 126 are adjustably mounted upon the arm 124 and are adapted to be secured in a variety of adjusted positions by means of set screws 127. Secured to the trough 123 at a point near the rearward end of the machine is an angular bracket 128 provided with an opening therein for the reception of the rod 129 formed with an enlarged head 130 at one end thereof and having its other end adjustably secured at 131 in a lever 132. The lever 132 is pivoted at 133 upon a bracket 134, which is secured to the transverse beam 7 at the rear of the machine by bolts 135. This lever 132 is adapted for co-operation with the projecting end 136 of one of the shafts 29 for a purpose which will be described. The horizontal frame member 119 is rigidly secured to the upper ends of the supports 112 and 116 and is capable of being held in various positions of vertical adjustment by the set screws 113 and 118, the better to accommodate the trough to properly support the different sizes of pipe. The brackets 120 are rigidly secured both to the member 119 and to the member 121 thereby holding these members in position to form a rigid structure. By means of the straps 122 the trough is pivotally supported upon the frame member 119 in such a manner as to be capable of movement about said member. The weights 126 are sufficiently heavy to normally counterbalance the weight of the trough and the pipe supported thereby but have a slight excess thereover, so that when a considerable length of pipe is in the trough the trough may be tilted by the extension 136 striking the lever 132. A plurality of tongues 137 are rigidly secured to the horizontal rod 119 and are so positioned that they are adapted to lie in slots 138 cut in one side of the trough when the trough is in its normal position, with the upper faces of the tongues 137 substantially flush with the upper surface of one side of the trough. Adjustably mounted upon the horizontal member 121 is a sleeve 140 provided with a threaded stem 141 formed integral with said sleeve. A block 142 has arms 143 formed with semi-circular bearing portions for engagement with one side of the rod 121, the said block being provided with a circular opening therein for the reception of the stem 141. A washer 144 is positioned upon the upper face of the block 142 and a wing-nut 145 when threaded upon the end of the stem 141 draws the sleeve 140 within the recess formed by the shoulders of the block, thus clamping the block securely in position upon the rod 121, and also securing the washer 144 firmly against the upper face of the block. Upon a bearing 146 formed upon the block 142 is pivotally mounted one end of the trip member 147 and pivotally mounted upon the trip member as at 148 is an arm 149 provided with an opening therein for the reception of the rod 107. The arm 149 is provided with a set screw 150 for securely locking the arm to the rod 107 in different adjusted positions therealong. A bracket member 151 is secured by a bolt 152 to the upstanding bracket member 120 which is positioned near the rear of the machine, the bracket member 151 being provided with an opening therein for the reception of the rod 107, in such a manner to permit the movement of the rod longitudinally of the machine. The trip member is thus pivotally attached to the block 142 which is in its turn firmly secured to the upper horizontal frame member 121. The block 142 may be secured at any desired point upon the member 121 and held in position thereon by tightening the nut 145. As the trip member is pivotally secured to the rod 107 at 148, any movement of the lower end of the trip member in a direction longitudinally of the machine tends to draw the rod 107 therewith as the trip pivots about its bearing 146. The rod 107 being flexible is able to approach the upper horizontal frame member slightly as may be occasioned by the trip member being pivoted to the upper horizontal frame member.

If it is found convenient or desirable, other brackets 151 may be attached in similar manner to one or more of the upstanding brackets 120, for the purpose of providing support for the longitudinal rod 107. A coiled spring 170 is attached at one end to the rod 107, its other end being secured to one of the upstanding brackets 120 for the purpose of drawing the rod forwardly upon the release of the trip 147 by the discharge of the pipe. Adjustably mounted upon the rod 107 at a point rearwardly of the collar 108 is a second collar 108', the collar 108' being adapted to cooperate with the forked end 106 of the arm 105 for operating the air valve to the cylinder 90 upon the release of the trip 147.

While this machine is capable of general use in cutting pipe or other suitable material into fixed and equal lengths, it is designed more particularly for use in connection with a tube mill in which the tubing is formed from sheets of metal, and its operation will be discussed in connection with such use. As the metal tubing indicated in dotted lines upon Figs. I and II and designated by the reference character A is fed from the tube mill it passes between the jaws 96 and 97 of the chuck, as indicated on Figs. XV, XVI and XVII and into the upper portion of the trough 123, the trough acting as a guide and support for the pipe in its passage therethrough. When the pipe in its passage through the trough contacts with the lower end of the trip member 147, which as shown extends downwardly within the trough, the trip member will be forced rearwardly, pivoting about its point of connection to the block 142 and will draw the rod 107 rearwardly by reason of its being firmly secured thereto by the set screw 150. As the rod 107 is drawn in a rearward direction, the collar 108 adjustably secured thereto engages the fork 106 of the arm 105 to rotate the valve stem 104, thus placing the cylinder 90 in communication with the compressed air supply pipe 101 for admitting compressed air to the cylinder. When compressed air is admitted to the cylinder the plunger is immediately depressed and the chuck jaws are forced together to securely grip the pipe therebetween. As the pipe continues to advance after having pushed the trip 147 forwardly the end of the trip member rides upon the upper surface of the pipe thus holding the rod 107 drawn forwardly and the valve 103 remains in such a position as to maintain an open passage between the air supply and the pressure cylinder. The chuck jaws consequently continue to grip the pipe during its advance until they are positively released therefrom. As the jaws of the chuck are carried by a support which is fixed to the frame of the lower movable carriage, the carriage will be propelled in a rearward direction along the machine by the rearward movement of the pipe; the previously described grooved wheels 13 and 17 engaging with the longitudinal bars 8, and from the construction thereof preventing any angular movement or tilting of the movable carriage with respect to the bars. As the longitudinally movable carriage advances the roller 60 on the lever arm 59 being in its extended position as shown in Fig. IX, will contact with the face 26 of the cam member 22, and the transversely movable carriage 27 will be forced to travel across the machine against the tension exerted by the spring 35. The carriage 27 being supported for travel upon the transverse rods 10 by the grooved wheels 31 and 32, as previously described, will be secured against tilting or movement in a sidewise direction with respect to the said rods. The motor 73 being connected to the shaft 79 through the pulleys 76 and 78 and the endless belt 77 may rotate the shaft constantly during the advance of the carriage. As the carriage 27 proceeds across the frame in a direction transverse thereof, the saw will come in contact with the pipe, and when the carriages have reached a position approximating the extent of their forward movement, will have severed the pipe. It will be understood that although the pipe is moving rearwardly through the machine, the two carriages being attached to the pipe move rearwardly at the same speed, consequently there is no binding action on the saw as it moves transversely of the machine to cut the pipe and as the pipe is cut at a point rearwardly of the point of connection of the clamping jaws thereto the cutting of the pipe does not of itself disturb the forward movement of the carriage. By means of the manner of mounting the shaft 79 and the provision of the lip 70, above referred to, the severe strain occasioned by the saw cutting through the pipe is transmitted directly to the main portion of the second carriage frame, thus preventing excessive strain upon the connections. As the longitudinally movable carriage reaches a position near the end of its rearward movement, the chain 55 connecting the piston 49 and the plate 53 becomes taut, thus drawing the piston in a forward direction and causing air to be drawn through the valve 55 into that portion of the cylinder at the left of the piston head as seen in Fig. IV. When the traveling carriages have advanced to such a point that the saw has entirely cut through the pipe, the chain 66 connecting the link 65 and the frame of the machine, will become taut, and the arm 59 carrying the roller 60 will thus be drawn inwardly beyond the edge of the platform 27 against the tension of the spring 63, whereupon the tension of the spring 35 will tend to return the platform 27 to its initial position at the right of the machine as shown in Fig. VI, before the longitudinally moving traveling carriage has been released from the pipe for return to its initial position. When the platform 27 is withdrawn toward the right, as seen in Fig. VI, it will strike the buffers 67 and thus deaden the shock that would otherwise be experienced. When the platform 27 is released for return movement transversely of the frame, it will occupy a position as shown in Fig. X, wherein the extended end 136 of the shaft 29 extends beyond the lever 132, and in a position relative thereto as shown diagrammatically in Fig. XI. The end portion 136 of the shaft moving to the right, as shown in Fig. XI will move the lever 132 to the dotted line position as shown in that figure, thereby tilting the trough to its dotted line position, as shown in that figure, and discharging from the trough the severed portion of the pipe. The trough 123 being pivotally mounted upon the horizontal member 119, as described, and its weight and the weight of the tube contained therein being counterbalanced by the weights 126, the impulse communicated to the lever 132 by the end portion 136 of the shaft is sufficient to tilt the trough against the weight 126, and thereby discharge the cut tube from the trough. The fingers 137 being fixedly secured to the horizontal member 119 will remain in their original position as shown in Fig. XII, when the trough is tilted, and thus will assist in discharging the tube from the trough. As soon as the tube has been discharged, the weights 126 upon the arms 124 will be sufficient to return the trough and its connected parts including the lever 132 to their initial position, as shown in the full lines of Fig. XI.

Upon the discharge of the tube from the trough, the trip member which had been pressed forwardly by the tube to allow its end to slide over a portion of the advancing tube will be returned to its initial position together with the rod 107 to which it is attached, by reason of the tension exerted by the spring 170 which connects the rod 107 with one of the brackets 120. Upon the return of the rod and the trip member attached thereto, to their initial positions, the button 108′ mounted on the rod 107 will strike the fork 106 of the arm 105, which then occupies a rearward position upon the machine since it is carried with the longitudinally traveling carriage, and moves the arm 105 to close the valve 103. Pressure upon the plunger 92 being thereby released the jaws 96 and 97 of the chuck are released from their gripping action upon the tube A, and the horizontally traveling carriage is thus free to return to its initial position at the front of the machine. When the longitudinally traveling carriage is thus free to move, it is drawn toward the front of the machine by the weight 40 exerting a pull upon the cable 37 attached to the bracket 33. Air having been drawn into that portion of the cylinder 49 at the left of the piston head as seen in Fig. IV, during the latter part of the forward movement of the carriage, this air cushions the backward movement of the carriage as the plunger 49 strikes the plate 53. In the return movement of the longitudinally traveling carriage, the chuck jaws 96 and 97 slide freely over the tube A. It will be understood that the tube A is forced into the machine from the tube mill, with a substantially constant speed, and that the transversely movable platform is released for its return movement slightly before the release of the longitudinally moving platform.

While I have shown and described in considerable detail a specific embodiment of my invention, it is to be understood that this showing and description is illustrative only and for the purpose of rendering my invention more clear, and that I do not regard the invention as limited to the details of construction illustrated or described, nor any of them, except in so far as I have included such limitations within the terms of the following claims, in which it is my intention to claim all novelty inherent in my invention broadly as well as specifically.

What I claim as new and desire to secure by Letters Patent is:

1. In a device of the class described, in combination, a supporting frame, a carriage movably mounted on said frame, releasable clamping means movable with said carriage, cutting mechanism supported by the carriage, and movable across the path of movement of the clamping means, and means for operating said cutting mechanism.

2. In a device of the class described, in combination, a supporting frame, a carriage movably mounted on said frame, releasable clamping means mounted upon the carriage for movements therewith, cutting mechanism supported by the carriage, and movable across the path of movement of the clamping means, and means for operating said cutting mechanism.

3. In a device of the class described, in combination, a supporting frame, a carriage movably mounted on said frame, releasable clamping means movable with said carriage, a second carrige movably mounted upon the first named carriage, cutting mechanism carried by the second carriage, and movable across the path of movement of the clamping means, and means for operating said cutting mechanism.

4. In a device of the class described, in combination, a supporting frame, a carriage movably mounted on said frame, releasable clamping means mounted upon the carriage for movement therewith, a second carriage movably mounted upon the first named carriage, cutting mechanism carried by the second carriage, and movable across the path of movement of the clamping means, and means for operating the cutting mechanism.

5. In a pipe cutting machine in combination, a carriage, clamping means for clamping the carriage to a pipe, cutting mechanism for cutting the pipe, and means for discharging a portion of the pipe laterally from the machine after the completion of the cutting operation.

6. In a machine of the class described, in combination, a carriage, a clamping means for clamping the carriage to material to be cut, cutting mechanism supported by the carriage, and means for operating the cutting mechanism.

7. In a machine of the class described, in combination, a carriage, clamping means for clamping the carriage to material to be cut, a second carriage movable in a direction transverse to the path of movement of the first carriage, and cutting mechanism carried by the second carriage.

8. In a machine of the class described, in combination, a carriage, clamping means for clamping the carriage to material to be cut, cutting mechanism for cutting the material, and means for discharging a portion of the material from the machine transversely to the path of movement of the material after the completion of the cutting operation.

9. In a machine of the class described, in combination, a carriage, clamping means for clamping the carriage to the material to be cut, cutting mechanism for cutting the material, means for discharging a portion of the material from the machine after the completion of the cutting operation, and means for releasing the said clamping means upon the operation of the discharging means.

10. In a machine of the class described, in combination, a movable carriage, a clamping means for clamping the carriage to the material to be cut, a second movable carriage, cutting mechanism carried by the second carriage for cutting the material, and means for moving said second carriage in a direction transverse to the path of movement of the first carriage.

11. In a machine of the class described, in combination, a movable carriage, a clamping means for clamping the carriage to material to be cut, a second movable carriage, cutting mechanism carried by the second carriage for cutting the material, means for moving said second carriage in a direction transverse to the path of movement of the first carriage, and means for interrupting the movement of the second carriage after the completion of the cutting operation.

12. In a machine of the class described, in combination, a movable carriage, a clamping means for clamping the carriage to material to be cut, a second movable carriage, cutting mechanism carried by the second carriage for cutting the material, means for moving the said second carriage in a direction transverse to the path of movement of the first carriage, and means for returning the second carriage to its initial position relative to the first carriage after the completion of the cutting operation.

13. In a machine of the class described, in combination, a carriage, a clamping means for clamping the carriage to material to be cut, a second carriage movable relative to the first carriage, cutting mechanism carried by the second carriage for cutting the material, means for discharging a portion of the material, from the machine upon the completion of the cutting operation, and means carried by the second carriage for actuating the discharging means.

14. In a machine of the class described, in combination, a carriage, a second carriage movable relatively to the first carriage, discharging means, and means carried by the second carriage for actuating the said discharging means.

15. In a machine of the class described, in combination, a movable carriage, a second carriage movable transversely of the path of movement of the first carriage, means for returning the second carriage to its initial position relatively to the first carriage at a predetermined point in the movement of the first carriage, a discharging means, and means upon the second carriage for actuating the discharging means upon the return of the second carriage to its initial position relative to the first carriage.

16. In a machine of the class described, a frame, a movable carriage, a second carriage movable relative to the first named carriage, and means for moving the second carriage comprising in combination, a pivoted arm and a cam member, one upon the carriage and the other upon the frame, said arm in one of its positions being adapted to engage with same cam member to shift the second carriage during the movement of the first carriage.

17. In a machine of the class described, a movable carriage, a clamping means mounted thereon, comprising a plurality of jaws, pneumatic operating means for moving said jaws, and means for actuating said pneumatic means to release the jaws at a predetermined point in the travel of the carriage.

18. In a machine of the class described, a carriage, a clamping means mounted thereon, comprising in combination, a plurality of jaws, pneumatic means for operating said jaws, and an automatically operated valve for controlling said pneumatic means.

19. In a machine of the class described, a discharging means comprising, a pivoted trough, and an arm mounted upon said trough, a weight on said arm, and a lever connected to said trough for actuating the same.

20. In a machine of the class described, a carriage, a discharging means comprising, a pivoted trough, and a lever connected to said trough, and means carried by the carriage for actuating the pivoted lever.

21. In a machine of the class described, a clamping member comprising a plurality of jaws, a piston for operating the jaws, a valve for controlling the movement of the piston, a trip, and means for controlling the valve from the trip.

22. In a machine of the class described, a discharging means comprising, a horizontal frame, a trough pivoted thereon, supports for said frame and means for securing the frame in a variety of vertical positions.

23. In a metal working machine, a frame, a tiltable trough carried by said frame, a counter-balance for said trough, means for feeding lengths of pipe longitudinally into said trough, and means connected with said trough for tilting the same under the influence of an impulse automatically imparted thereto.

24. In a metal working machine, a frame, a pivoted trough carried thereby, means for feeding lengths of pipe longitudinally into said trough, means for normally holding said trough in raised position, and automatically actuated means for communicating an impulse to said trough whereby the trough may be tilted.

25. In a metal working machine, a main frame, operating mechanism supported by said frame, a pivoted trough extending from said main frame, means for feeding lengths of pipe longitudinally into said trough, and automatically actuated means for tilting said trough to discharge material therefrom.

26. In a metal working machine, a discharging mechanism connected therewith comprising a trough tiltable upon an axis directly adjacent to the trough itself, and operating mechanism for imparting the initial impulse to the trough to tilt the same.

27. In a metal working machine, a discharging mechanism connected therewith comprising a tiltable trough, and a traveling carriage adapted upon movement in one direction to impart movement to said trough to tilt the same.

28. In a machine for cutting a metal bar into lengths, a cutter, a carrier therefor, and means actuated by said carrier for discharging the cut portions of said bar from the machine.

29. In a machine for cutting a metal bar into lengths, a cutter, a carrier therefor adapted to be advanced toward said metal bar, and means actuated by a return movement of said carrier for discharging a cut length of said bar.

30. In a metal working machine, a traveling carriage, a cutter carried thereby for cutting a metal bar into lengths, and means actuated by said carriage after the completion of each cutting operation for discharging the cut portion from the machine.

31. In a metal working machine, a reciprocating carriage, a clamping means mounted on said carriage, and means for automatically operating said clamping means to cause the same to engage work carried by said machine during movement of the carriage in one direction.

32. In a metal working machine, a reciprocating carriage, a clamping means mounted on said carriage, and means for automatically releasing said clamping means during movement of the carriage in one direction.

33. In a metal working machine, a traveling carriage, a clamping means mounted on said carriage, means for automatically operating said clamping means to cause the same to engage work carried by the machine during movement of the carriage in one direction, and means for releasing said clamping means during movement of the carriage in the opposite direction.

34. In a metal working machine, a reciprocating carriage, a clamping means mounted on said carriage, and means for automatically operating said clamping means at a predetermined point in the movement of said carriage.

35. In a metal working machine, a reciprocating carriage, means for reciprocating the same including clamping means mounted on said carriage, and means for automatically operating said clamping means to cause the same to engage work carried by the machine at a predetermined point in the movement of said carriage.

36. In a metal working machine, in combination, a supporting frame, a carriage movably mounted on said frame, a second carriage mounted on said first carriage for movement in a direction transverse to the direction of movement of the first carriage, and cutting mechanism operatively supported by said second carriage.

37. In a metal working machine, a supporting frame, a carriage movably mounted on said frame, a second carriage mounted upon said first carriage for movement in a direction transverse to the direction of movement of said first carriage, and adjustable means for regulating the extent of travel of the second carriage relative to the first named carriage.

38. In a metal working machine, a supporting frame, a carriage movably mounted upon said frame, a second carriage mounted upon said first carriage for movement transverse to the direction of movement of said first carriage, and means for limiting the movement of said second carriage in the direction of movement of the first named carriage.

39. In a metal working machine, a supporting frame, a carriage movably mounted upon said frame, a second carriage mounted upon said first carriage for movement transverse to the direction of movement of said first carriage, and means for reversing the direction of movement of the second carriage at a predetermined point in the movement of the first carriage.

40. In a metal working machine, a supporting frame, a movable carriage mounted on said frame, and a second carriage mounted upon said first named carriage and movable in a direction transverse to the direction of movement of said first carriage, said second carriage being provided with a cutting mechanism operable during the movement of said carriages.

41. In a metal working machine, a supporting frame, a movable carriage mounted upon said frame, and a second carriage mounted upon said first named carriage and movable in a direction transverse to the direction of movement of the first carriage, said second carriage being provided with a cutting mechanism operable during movement of said carriages in one direction.

42. In a metal working machine, a supporting frame, a movable carriage mounted upon said frame, a second carriage mounted upon said first named carriage and movable in a direction transverse to the path of movement of said first carriage, a cutting apparatus carried by said second carriage, and means for operating the cutting apparatus.

43. In a metal working machine, a supporting frame, a movable carriage mounted upon said frame, a second carriage mounted upon said first named carriage and movable in a direction transverse to the direction of movement of said first carriage, and means for imparting movement to said second carriage during the movement of said first named carriage.

44. In a metal working machine, a traveling carriage, a clamping means mounted on said carriage, means for automatically operating said clamping means to cause the same to engage work carried by the machine, and means actuated by the work for releasing said clamping means.

45. In a metal working machine, a supporting frame, a carriage movably mounted upon said frame, a second carriage mounted upon said first named carriage and movable in a direction transverse to the path of movement of the first named carriage, and separate means for limiting the movements of the carriages.

46. In a machine of the class described, a frame, a carriage movable back and forth thereupon, guides upon the said carriage arranged transversely to its line of movement, a second carriage free to move upon said guides, a cam adapted to engage and move the second carriage upon its guides as the first carriage moves in one direction, said cam being adjustable to vary the extent of movement of the second carriage upon its guides.

47. In a machine of the class described, a frame, a carriage movable back and forth thereupon, guides upon the said carriage arranged transversely to its line of movement, a second carriage free to move upon said guides, a cam mounted upon the frame, an abutment movably mounted upon the second carriage and adapted when in one position to be engaged by the cam to move the second carriage along its guides as the first carriage moves upon the frame.

48. In a machine of the class described, a frame, a carriage movable back and forth thereupon, guides upon the said carriage arranged transversely to its line of movement, a second carriage free to move upon said guides, a cam mounted upon the frame, an abutment movably mounted upon the second carriage and adapted when in one position to be engaged by the cam to move the second carriage along its guides as the first carriage moves upon the frame, means tending to hold the abutment in the said position, and means adapted to render said last named means ineffective when the first carriage has reached a predetermined point in its movement.

49. In a machine of the class described, a frame, a carriage movable back and forth thereupon, guides upon said carriage arranged transversely to its line of movement, a second carriage free to move upon said guides, a cam mounted upon the frame, a lever mounted upon the second carriage, having an abutment at one end for engagement by the cam, means tending to hold said lever in operative position, and means actuated by the movement of the first named carriage for swinging said lever upon its pivot to throw the abutment out of operative position during the movement of the first carriage in one direction.

50. In a machine for cutting measured lengths from a continuously moving pipe, a frame along which the pipe moves, a carriage movable parallel with the pipe, a cut off saw on said carriage, a pipe vise on said carriage directly behind said saw, whereby the carriage is pushed forward by the moving pipe when the vise is clamped thereupon, means for operating the saw as the carriage moves forward, automatic means for releasing the jaws of the vise after the sawing operation is completed, and means for retracting said carriage.

51. In a machine for cutting measured lengths from a continuously moving pipe, a frame along which the pipe moves, a carriage movable parallel with the pipe, a second carriage movable transversely of the first carriage, a cut off saw mounted on the second carriage, a pipe vise on said first named carriage directly behind said saw, said vise being adapted to grasp said pipe thereby causing forward movement of the carriage, means for driving the saw, means for moving the second carriage transversely as the first carriage moves forward, automatic means for releasing the jaws of the vise after the sawing operation is completed and means for retracting said carriage.

52. In a machine of the class described, a frame, a carriage movable back and forth thereon, means for cushioning the impact of the carriage as it approaches one end of its path of movement, and automatic means for resetting said cushioning means as the carriage approaches the opposite end of the path of movement.

53. In a machine of the class described, a frame, a carriage movable back and forth thereon, a dash-pot mounted upon the carriage, a plunger for said dash-pot adapted to engage one end of the frame to cushion the movement of the carriage, and means for retracting said plunger as the carriage approaches the opposite limit of its motion.

54. In a machine of the class described, a frame, a carriage movable back and forth thereon, means for cushioning the movement of the carriage at one end of its course, said means comprising a dash pot and a plunger, and automatic means for resetting said cushioning means as the carriage approaches the opposite limit of its motion.

In testimony whereof, I affix my signature.

EDWARD KAMPER.